(12) United States Patent
Eilts

(10) Patent No.: US 6,393,073 B1
(45) Date of Patent: May 21, 2002

(54) METHOD OF FREQUENCY OFFSET ESTIMATION AND CORRECTION FOR ADAPTIVE ANTENNAS

(75) Inventor: Henry S. Eilts, Plano, TX (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/340,625

(22) Filed: Jun. 28, 1999

(51) Int. Cl.[7] .................... H03D 1/00; H04L 27/06
(52) U.S. Cl. .................... 375/340; 375/327
(58) Field of Search ................. 375/342, 326, 375/377, 364, 227, 254, 285, 231, 226, 344, 346, 371, 224, 327, 329, 340; 708/309, 311

(56) References Cited

U.S. PATENT DOCUMENTS

| | | | |
|---|---|---|---|
| 4,941,155 A | 7/1990 | Chuang et al. | 375/84 |
| 5,363,103 A | 11/1994 | Inkol | 342/13 |
| 5,581,582 A | * 12/1996 | Choi | 375/344 |
| 5,654,982 A | 8/1997 | Goodson et al. | 375/222 |
| 6,205,183 B1 | * 3/2001 | Dent | 375/261 |

FOREIGN PATENT DOCUMENTS

JP  09224062  8/1997 ........... H04L/27/22

OTHER PUBLICATIONS

PCT International Search Report dated Nov. 15, 2000 for PCT/US 00/16145 filed Jun. 12, 2000.

* cited by examiner

Primary Examiner—Chi Pham
Assistant Examiner—Jean Corrielus
(74) Attorney, Agent, or Firm—Baker Botts L.L.P.

(57) ABSTRACT

A method of frequency offset estimation and correction for adaptive antennas comprises receiving in a processor samples of a data set having a training data sample sequence. A batch least squares weight solution is computed for the training data sample sequence to obtain a least square error for each sample. Each error sample is rotated by multiplying by the conjugate of a sample of the reference training sequence and each rotated error sample is numbered (in the order received). A straight line is fit to the imaginary part of the rotated error sample (as a function of sample number) to obtain a frequency offset estimate. Each sample in a time slot of the samples of a dataset is multiplied by a complex exponential function of the frequency offset estimate.

12 Claims, 6 Drawing Sheets

METHOD OF FREQUENCY OFFSET ESTIMATION AND CORRECTION FOR ADAPTIVE ANTENNAS

TECHNICAL FIELD OF THE INVENTION

This invention relates to frequency offset estimation and correction and more particularly to frequency offset correction by least squares training sequence processing.

BACKGROUND OF THE INVENTION

Adaptive array antennas are widely proposed for cellular radio base stations, see the technical article "Smart Antennas for Wireless Systems", Jack H. Winters, IEEE Personal Communications, vol. 5, no. 1, February, 1998. An adaptive array antenna is an array of two or more antenna elements and specialized signal processing to combine the antenna outputs into a single array output. These antennas are called adaptive because their directional sensitivities change in response to the signal environment. Adaptive antennas are commonly controlled by a least squares algorithm. This invention uses the variables normally computed by the least squares algorithm in controlling an adaptive antenna to estimate and correct frequency offsets in the desired received signals.

Adaptive antennas have several advantages over conventional antennas. First, adaptive antennas combine the element signals to provide optimized signal to interference plus noise ratio (S/(N+I)) in the array output. In so doing, it maximizes the desired signal while minimizing or nulling the undesired signals. Secondly, because the antenna adapts to the signal environment, changes are "tracked" as they occur in the environment. In particular, the cellular environment is characterized by fading and multipath transmission due to motion of the mobile phones. The signals at the elements of the array fade in a random manner. An adaptive antenna can track the fading, continually adjusting how the elements are combined to form the output, so that the fading is minimized at the array output for the desired signal.

To operate properly, the adaptive antenna recognizes desired signals from undesired signals. In the IS-136 digital cellular system, least squares processing in conjunction with a "training" or reference sequence is commonly proposed to control an adaptive antenna. Each mobile phone transmits an assigned sequence of 14 symbols (the reference sequence) periodically. The reference data sequence received by an antenna is compared with an internal reference sequence stored in the base station. Received signals that match the reference sequence are maximized, while all others are minimized. The reference sequence was originally included in the IS-136 standard for the control of adaptive equalizers. However, the reference sequence may also be used for the control of adaptive antennas. The reference sequence is used in a batch least squares computation to compute optimal weighting coefficients for combining the element signals into a single output. See, for example, Solving Lease Squares Problems, by Charles L. Lawson and Richard J. Hanson, Prentice-Hall, Inc. Englewood Cliffs, N.J., 1974, and "Solving Linear Least Squares Problems by Gram Schmidt Orthogonalization", Ake Bjork, Nordisk Tidskr. Informations-Behandling (BIT), vol. 7, 1967, pp. 1–21, for prior art batch least squares descriptions. One set of coefficients is computed for the complete reference sequence (i.e. the batch of 14 symbols), hence the name batch least squares. In performing the computation of optimal coefficients, many least squares algorithms compute error samples as intermediate variables in the computation. Error samples are the difference between the received output reference samples and the internal base station reference samples. The present invention uses these error samples to compute an estimate of the carrier frequency offset of the received output signal.

The mobile phone transmits voice data both before and after the reference sequence. Unlike the reference data sequence, the voice data is not known apriori, and different processing must be used. These data are processed by recursive least squares computations as described in the technical article "A Recursive Modified Gram-Schmidt Algorithm for Least Squares Estimation", Fuyun Ling, Dimitris Manolakis, and John G. Proakis, IEEE Trans. on Acoustics, Speech, and Signal Processing, vol. ASSP-34, No. 4, August, 1986, pp. 829–836. In the recursive least squares computations, the optimal combining coefficients are updated recursively on a symbol by symbol basis. A reference symbol is still needed for each received data symbol. Here, however, the reference symbol is derived from the current data symbol using coefficients computed for the previous data symbol. This is called a data derived reference. The initial coefficients obtained by batch processing of the training sequence are used to initialize the recursions.

The recursive least square processing used to control the adaptive antenna is sensitive to carrier frequency errors. A frequency error occurs when the carrier frequency transmitted from the mobile phone is incorrect. This is usually due to the poor quality frequency sources used in the mobile to minimize cost (up to 200 Hz. error is permitted in the IS-136 standard. EIA Interim Standard IS-136.2, Electronic Industries Alliance, Arlington, Va.). The IS-136 system uses $\pi/4$ offset DQPSK (differential quadrature phase shift keying), in which each symbol is coded into discrete phase states. A DQPSK frequency error causes the received symbols to have a progressive (i.e. increasing with each symbol) phase rotation in addition to symbol phases. The maximum permitted frequency offset of 200 Hz. causes a phase shift of approximately 3° per symbol. This does not cause major problems over the 14-symbol batch least squares processing of the training sequence data. However, over the typical 134 voice data symbols following the training sequence, the phase progression is sufficient to cause a failure of the recursive least squares processing.

There are several existing techniques for tracking and removing the carrier frequency error as described in *Data Communications Principles*, by Richard D. Gitlin, Jeremiah F. Hayes, and Stephen B. Weinstein, Plenum Press, New York, 1992, pp. 433 ff. Most of these are based on phased lock loop (PLL) concepts. These include the squaring loop, the Costas loop, and the data-directed PLL. Unfortunately, all these techniques are susceptible to interference. Thus, using one of these techniques to correct the frequency offset before the adaptive processing is not beneficial. The frequency correction technique will fail with the interference, thus causing the failure of the adaptive processing. Also, the use of a separate correction technique is undesirable because of the added computational cost and circuit complexity incurred.

Therefore in accordance with this invention the frequency errors are measured and corrected within the adaptive processing itself, thereby providing the frequency correction with significant immunity to interference without incurring excessive additional computations or hardware.

SUMMARY OF THE INVENTION

In accordance with the present invention, there is provided a method for correcting the frequency offset of a dataset by utilization of errors computed by least squares training sequence processing. These errors may be computed in the normal course of adaptive antenna or adaptive equalizer processing and are available in such systems without additional computation. The errors are utilized to estimate the frequency offset and the estimated offset is then used as a correction factor to correct the frequency offset of the dataset.

Further in accordance with the present invention, there is provided a method for correcting the frequency offset of received signals of a dataset by computing a least squares weight solution for a batch of data samples in a training sequence to obtain the least square error for each data sample. Each error sample is rotated by multiplication by the conjugate of a reference sample comprising a sample from the training sequence and then each rotated error sample is numbered in the order received. The slope of a line having a best fit to the set of imaginary parts of the rotated error samples is computed as a function of the number of each rotated error sample to obtain a value for a frequency offset estimate. Each data sample of the dataset is multiplied by an expression that includes the estimated frequency offset to obtain frequency offset corrected data samples. The frequency offset corrected data samples are recursively processed by a least square computation utilizing the frequency offset corrected sample to obtain corrected received signals for further receiver processing.

Further in accordance with the present invention, there is provided a method for correcting the frequency offset of received signals of a dataset by computing a plurality of values of estimated frequency offset and filtering the plurality of values to obtain filtered value for an enhanced frequency offset correction value.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
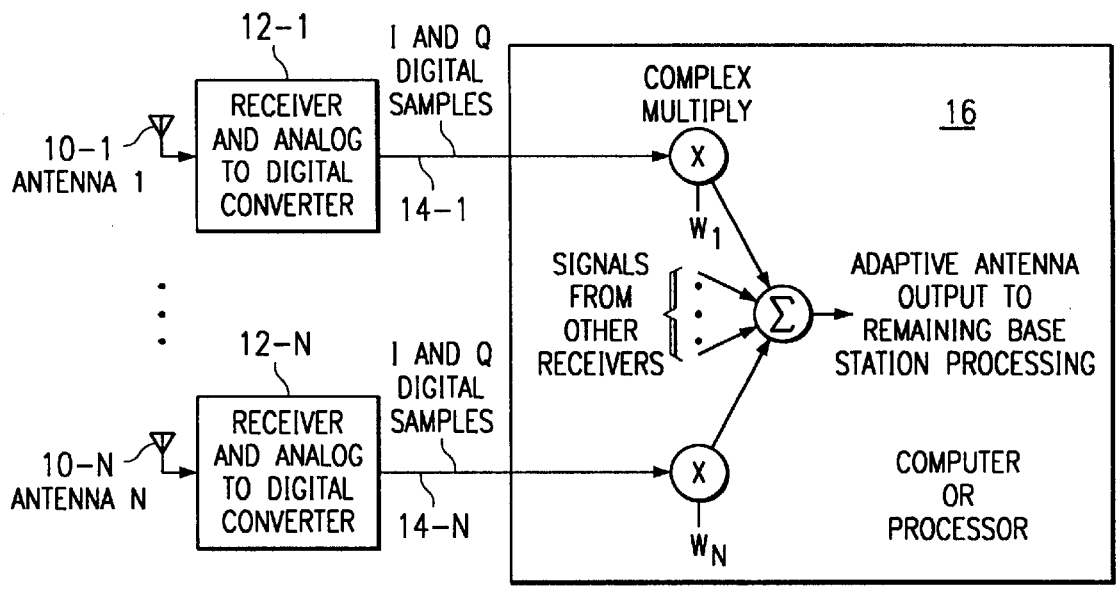
FIG. 1 is a block diagram of communications receiving system incorporating adaptive antenna processing of received signals.

An adaptive antenna structure for cellular base stations is shown in FIG. 1. On the cell tower is an array of N antenna elements 10, where N is 2 or more. The signal from each antenna element 10 is fed to a respective receiver 12 for processing and ultimately sampling and digitizing the signal. The receiver 12 provides digital inphase and quadrature (I and Q) sample pairs at the receiver output 14. The sampling of the antenna element signal by the respective receiver 12 is synchronized. That is, each receiver 12 samples the signal from the corresponding antenna element 10 at the same time as the other receivers. A set of samples from the array taken at the same time is called a sample vector, or equivalently a vector snapshot.

The remaining processing is normally completed in a digital signal processor (DSP) 16, comprising a computer optimized for processing sampled digital data, or is a high speed general purpose processor, such as the Motorola Power PC. The I and Q sample streams from each of the receivers 12 are fed to the processor 16, where the samples are combined into a single output sample stream.

Each I and Q sample pair can be considered to be a complex number. Thus, the receivers 12 are each providing a data stream of complex numbers to the processor 16. The processor 16 multiplies each complex data stream by a complex number and sums the resulting products to form the system output. The complex numbers that are multiplied with the data streams are called weights or weighting coefficients $W_i$ and the output sum is sometimes termed a weighted sum of the data. The subscript i ranges from 1 to N and associates a specific weight with a specific receiver data stream. The effect of the multiplication by the weighting coefficients is to adjust the amplitude and phase of each receiver output stream before it is summed into an output signal.

The complex data stream of each antenna element is a composite of many signals. A mobile phone transmits signals approximately omnidirectionally. Each antenna element signal travels along many paths, bouncing off buildings or other structures near the mobile or near the base station. Thus, when received at the base station, the signal from a mobile is typically a composite of signals arriving at the antenna elements from several directions with several different delays. Similarly, signals generated from other mobile phones that might interfere with a desired signal are also composite signals composed of many multipath signals. Each receiver 12 also generates noise, and must be considered.

By choosing appropriate values for the weighting coefficients $W_i$, specific components of the composite signals may be weighted such that these specific components add constructively at the summation, resulting in enhanced output for those components. It is also possible to choose weighting coefficients to cause certain components of the composite signals to add destructively at the summation, thus attenuating these components. Finally by properly choosing the complex weight coefficients, the element signals will add such that the output signal to noise plus interference ratio is maximized. This latter approach is usually the preferred approach. This is accomplished by using a least squares algorithm to compute appropriate weighting coefficients. In accordance with the present invention, the variables normally computed by the least squares algorithm are also used to compute an estimate of frequency offsets, which are then removed.

Figure 2:
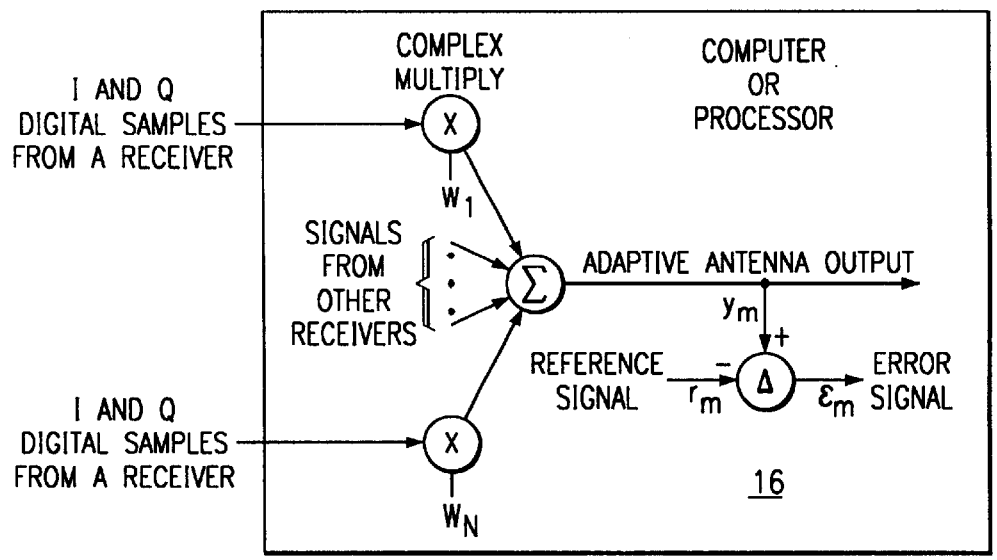
FIG. 2 is a block diagram of the processor of FIG. 1 incorporating error signal computation from adaptive antenna outputs and a reference signal.

The least squares approach is well known and well documented. The least squares algorithm chooses the weights to try to make the output stream match a stream either known apriori or internally generated, called the reference signal. In the cellular IS-136 standard, a portion of each time slot is devoted to transmitting a known sequence of 14 symbols, called the training sequence. So, in this case, the training sequence is known apriori and is used as the reference signal. The array output is subtracted from the reference signal to generate an error signal. A diagram showing the reference signal and the error signal as applied to adaptive antennas is shown in FIG. 2. For each sample of the array output (denoted $y_m$ in the Figure), there is a corresponding reference signal sample (denoted $r_m$) and a corresponding error sample ($\epsilon_m$). The subscript m in these variables denotes the sample number (i.e. the $m^{th}$ sample). The samples $y_m$, $r_m$, and $\epsilon_m$ are complex signals, having real and imaginary parts. The error is defined as:

$$\epsilon_m = y_m - r_m \quad (1)$$

The samples $y_m$, $r_m$ and $\epsilon_m$ are complex numbers, having real and imaginary parts. The least squares algorithm minimizes the sum of square errors, given by (S denoting sum, running over the length of the training sequence):

$$S = \Sigma_m \{Re^2(\epsilon_m) + Im^2(\epsilon_m)\} \quad (2)$$

That is, for each sample, the real part of the error and the imaginary part of the error are each squared and added into the sum. The least squares algorithm computes the weights such that the sum S is minimized. A property of this algorithm is that the output signal to interference plus noise ratio is maximized.

Figure 3A:
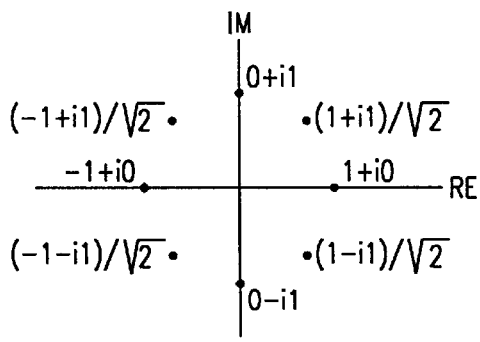
FIGS. 3A, 3B, and 3C are constellation plots for an IS-136 communications system showing constellation points, output samples and error samples, respectively.
Figure 3B:
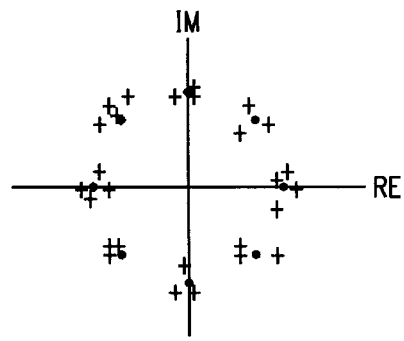
Figure 3C:
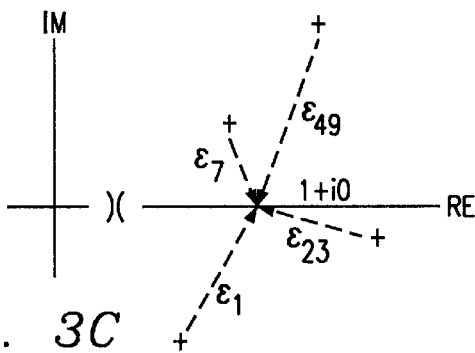

FIG. 3A shows a representative IS-136 signal constellation. The signal constellation is composed of 8 points on the unit circle in the real-imaginary plane. The incoming symbol (data) samples ideally should fall exactly on these points. However, noise, interference, multipath components, and frequency offsets all combine to perturb the incoming data off of the ideal constellation points. FIG. 3B shows the constellation with clusters of output samples around each point. FIG. 3C shows an expanded view about the (1+i0) constellation point and shows the errors $\epsilon_m$ associated with each data point. Error samples 1, 7, 23, and 49 are plotted. By computing weights to minimize the sum of square errors, the algorithm minimizes the average length of the errors. That is, the weights are chosen to make the average error as small as possible, and thus make the data samples fall as close as possible to the constellation points.

This approach to least square processing is called batch least squares, because a batch of samples (i.e., the batch of received samples corresponding to the training sequence samples) is used to compute a single set of weights valid over the whole batch. Since a single weight set is used for the whole batch, optimal performance (i.e., small output errors, $\epsilon_m$) requires that the signal scenario be relatively constant over the batch. If the scenario is changing, then an alternative approach, called recursive least squares, is preferred.

Recursive least squares updates a previous weight solution by incorporating the information of one additional snapshot into the solution from previous snapshots. Thus, a new weight solution is obtained for each snapshot. Usually the old data is de-emphasized in this process, so that the current weight solution is not influenced too heavily by past (stale) data. For best performance, the recursive approach should be used when a previous good weight solution exists. Recursive least squares is computationally more costly than batch least squares. However, recursive processing is preferred if the signal environment is changing so that a batch weight solution would not be accurate for the whole batch.

The IS-136 signaling format specifies the transmission of 162 symbols in a time slot of 6.67 millisecond duration. Within each time slot is a 14 symbol training sequence (0.58 milliseconds). In a 900 MHz. cellular system, the signal scenario is stable enough for batch processing for time intervals approaching one millisecond. So, batch processing is usefully employed on the training sequence, but cannot be employed on the whole time slot. A common processing approach is to batch process the training sequence and transition to recursive processing for the remaining data. The batch training sequence processing provides a good weight solution to initialize the recursive data processing.

One of the problems with this approach is the frequency offset of the mobile phone. For reasons of economy, the IS-136 standard specifies that the mobile phone is allowed to have frequency errors of up to 200 Hz. This is equivalent to about 3 degrees per symbol of phase shift. Through simulation and experiments with actual cell phone datasets it has been determined that progressive phase shifts of this size cause the recursive data processing to fail. That is, the recursive least square weights do not improve the output signal to noise ratio as expected, and often make it worse. This failure occurs only in the recursive part of the processing. The batch processing of the training sequence is insignificantly degraded, and training sequence processing proceeds normally. Thus, there is a need to correct the frequency offset to enable the recursive least squares processing of the data to work.

The reason the batch processing of the training sequence doesn't fail is that the 3° per symbol maximum offset error is not sufficient over the 14 symbols of the training sequence to cause an incoming data point to be associated with a wrong constellation point. For illustration, assume that the 1st symbol has zero error. With the 3° per symbol offset error, the 14th symbol will have a 42° error. However, the training sequence adaptive weights have the ability to offset the phase of the entire sequence by a constant amount. In this case, the adaptive weights will offset the incoming data by −21°, so that the errors after processing will be +/−21° maximum. This is insufficient to cause a failure of the training sequence processing.

There are many different methods of computing batch and/or recursive least squares solutions. The choice of method is dictated by computational efficiency, numerical accuracy of the solution, the availability of a data covariance matrix or other matrix function of the data, the availability of special-purpose computational hardware (such as systolic array hardware), and the need or desire for computed values for variables in addition to the weight coefficients. For example, many of the least squares methods compute the residual errors $\epsilon_m$ as a matter of course in the weight computation. Fortunately, one of the most computationally efficient and accurate methods, the modified Gram-Schmidt method, computes the least square errors as part of its normal computations. So, the errors are available free of computation cost.

Figure 4:
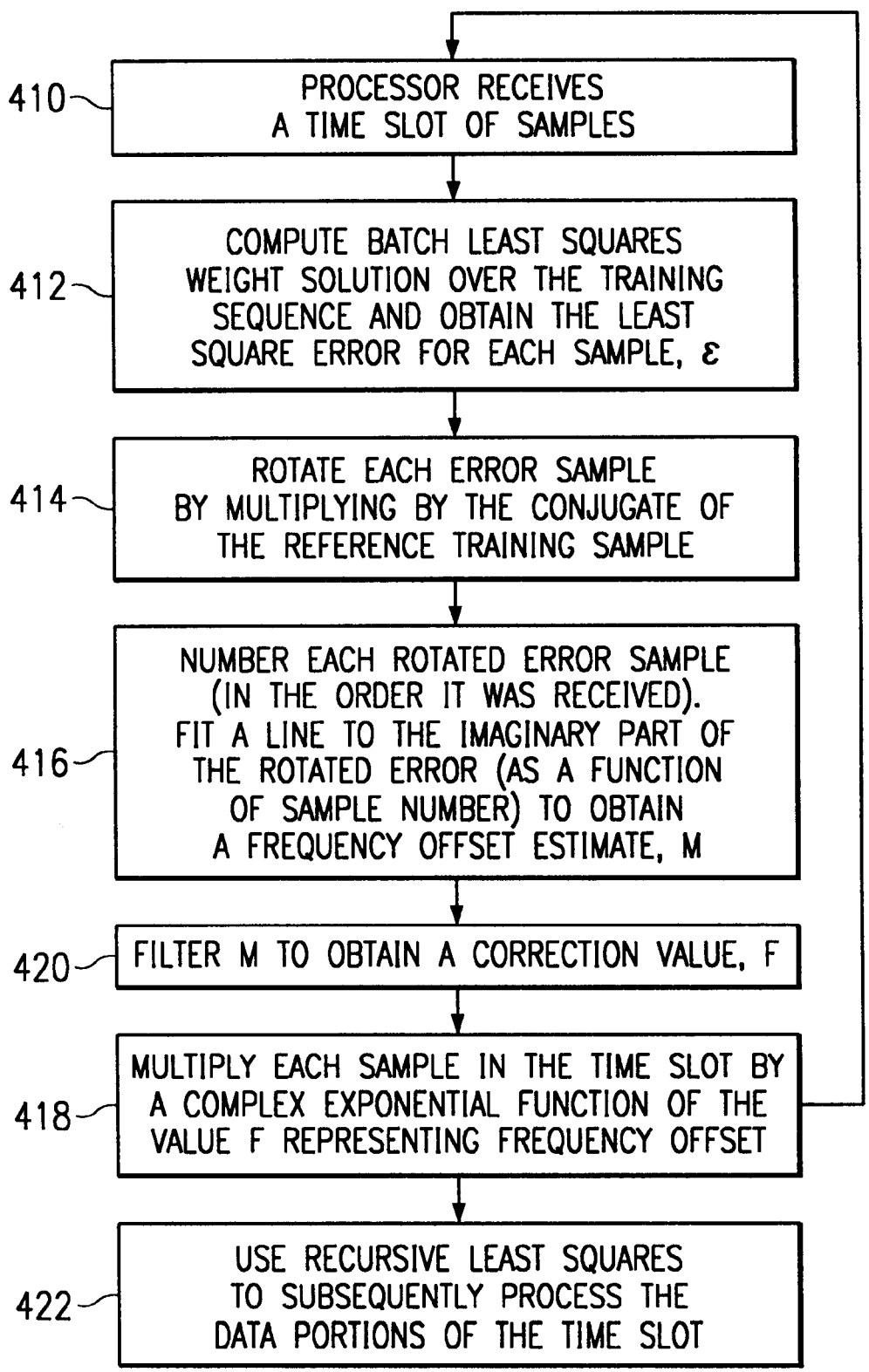
FIG. 4 is a flow chart of time slot processing including frequency offset correction in accordance with the present invention.

Referring to FIG. 4, there is shown a flow chart of the computations for processing a time slot of samples. The processor 16 receives a block of samples 410 (usually a time slot block, but not necessarily so) and begins by computing at routine 412 a batch least squares weight solution over the training sequence. In the course of processing, the least square error $\epsilon_m$ is computed, if not previously computed as by-product of the weight solution.

A frequency offset results in a progressive circular phase rotation of the output data around the unit constellation circle (see FIG. 3B). The batch least squares adaptive weighting applies a compensating phase shift and rotates the output samples so as to be best aligned with the constellation points. However, since one set of weight coefficients is applied to the whole set, (the received training sequence in this case) it only compensates for the average phase error. The result is that the phase errors are minimal in the center of the training sequence and grow larger (but of opposite sign) at the beginning and end of the training sequence.

Mathematically, this is described by defining the output sample $y_m$ from equation (1) to be given by $$y_m = r_m + \epsilon_m \quad (3)$$

The error ($\epsilon_m$) is composed of a deterministic (non-random) component due exclusively to frequency offset ($\epsilon_{fm}$) and a random component ($\epsilon_{om}$) due to all other causes (noise, interference, etc.). That is, $$\epsilon_m = \epsilon_{om} + \epsilon_{fm} \quad (4)$$

The frequency offset causes the received constellation to advance (or retard for negative frequency offsets) in phase relative to the base station fixed constellation, The phase advance from symbol to symbol is given by, $$\Delta\phi = 2\pi f_o T \quad (5)$$

where $f_o$ is the frequency offset and T is the symbol period. The accumulated phase advance after m symbols is therefore $$\phi_m = 2\pi f_o (m-1)T + C, \quad (6)$$

where $f_o$ is the frequency offset and T is the symbol period. The constant C is the phase shift applied by the adaptive weighting.

Figure 5:
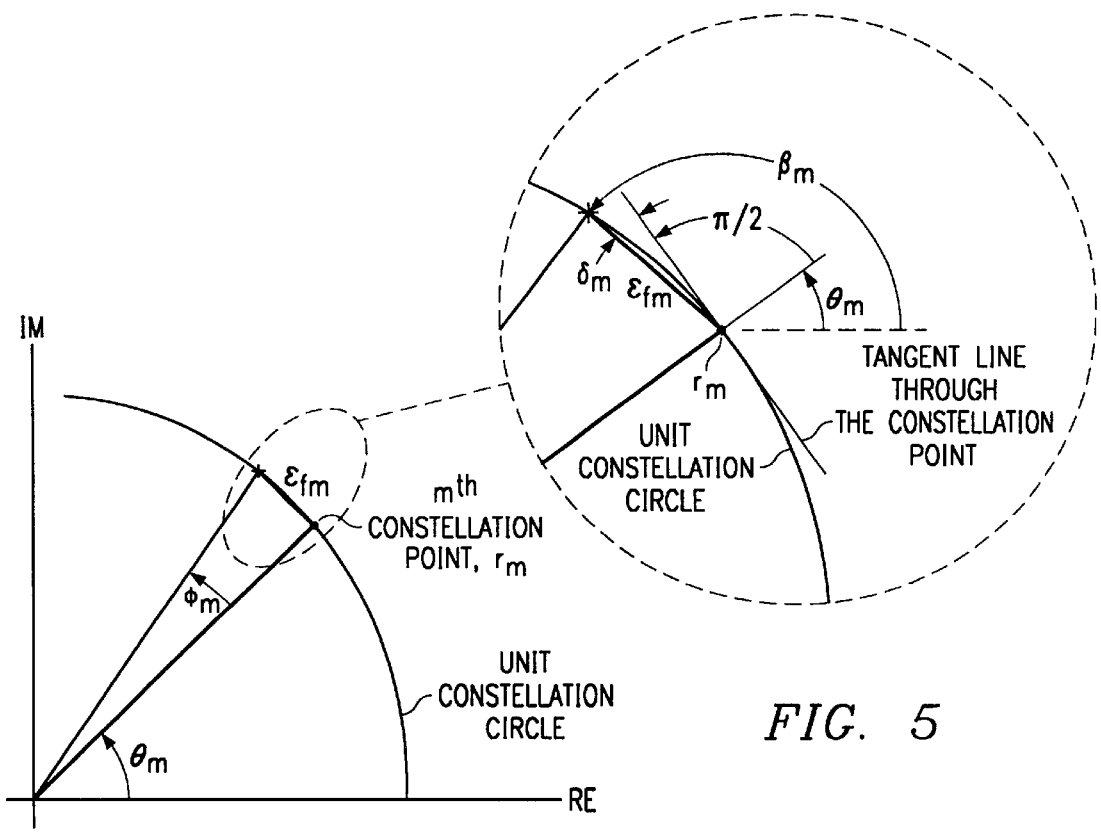
FIG. 5 is a pictorial of variables in support of the analysis for determining frequency offset correction.

Referring to FIG. 5, there is shown the geometry and variables described below.

The $m^{th}$ reference symbol, $r_m$, can be written in exponential form as $$r_m = \exp(i\theta_m), \quad (7)$$

where $\theta_m$ is the angle shown in FIG. 5. The frequency offset causes the received data to be displaced from the reference constellation point by the phase rotation $\phi_m$, which is given in Equation 6 and is also shown in FIG. 5. The displacement is the error component due to frequency offset, $\epsilon_{fm}$. This error component can also be written in exponential form as an amplitude times a complex exponential. That is, $$\epsilon_{fm} = d_m \cdot \exp(i\beta_m) \quad (8)$$

Next, there is derived approximate expressions for both $d_m$ and $\beta_m$, which will later be substituted into Equation 8. The distance $d_m$ is the amplitude of the error component $\epsilon_{fm}$ and is given by $$d_m = 2 \cdot \sin\left(\frac{\phi_m}{2}\right) \quad (9)$$

Making the approximation that $\sin(\alpha) \cong \alpha$ for small angles $\alpha$, $d_m$ is closely approximated by $$d_m \cong \phi_m \quad (10)$$

The angle $\beta_m$ is the sum of three angles shown on FIG. 5, and is given by $$\beta_m = \theta_m + \frac{\pi}{2} + \delta_m \quad (11)$$

As can be seen in FIG. 5, the component $\beta_{fm}$ lies almost on a line tangent to the circle at the point $r_m$. That is, the angle $\delta_m$ is almost zero. Therefore, $\delta_m$ is closely approximated by $$\beta_m \cong \theta_m + \frac{\pi}{2} \quad (12)$$

Substituting the approximations for $\beta_m$ and $d_m$ into Equation 8 results in the desired approximation for $\epsilon_{fm}$:

$$\varepsilon_{fm} \cong \phi_m \cdot \exp\left(i\left(\theta_m + \frac{\pi}{2}\right)\right). \quad (13)$$

Observe that the amplitude component of $\epsilon_{fm}$ is $\phi_m$. Also, the phase component of $\epsilon_{fm}$ is $\theta_m + \pi/2$ and has a part due to the particular reference symbol $\theta_m$ and a constant part $\pi/2$. The $\theta_m$ varies with each symbol and is a direct result of the modulation.

Referring to FIG. 4, routine 414 is a computation to remove the modulation by rotating the error samples $\epsilon_m$. The purpose for doing this is to remove the term $\theta_m$ present in Equation 13. The rotation is done by multiplying each error sample by the conjugate of its corresponding reference symbol $r_m$ to obtain a rotated error sample $\epsilon'_m$, where the prime denotes rotated. The rotated errors are:

$$\varepsilon'_m = \varepsilon_m \cdot \exp(-i\theta_m) \quad (14)$$
$$= (\varepsilon_{om} + \varepsilon_{fm}) \cdot \exp(-i\theta_m)$$
$$= \varepsilon'_{om} + \varepsilon'_{fm}$$

The random component $\epsilon_{om}$ and the frequency offset component $\epsilon_{fm}$ of the error each rotate to become $\epsilon'_{om}$ and $\epsilon'_{fm}$, respectively. The components due to frequency offset are, after substituting Equation 6 for $\phi_m$, $$\varepsilon'_{fm} = \varepsilon_{fm} \cdot \exp(-i\theta_m) = \phi_m \cdot \exp\left(\frac{i\pi}{2}\right) \quad (15)$$
$$= i \cdot [2\pi f_o(m-1)T + C]$$

After rotation in routine 414, the errors due to frequency offset $\epsilon_{fm}$ are purely imaginary numbers. The sequence of errors $\epsilon_{fm}$ is a linear progression with sample number, progressing along the imaginary axis, directly proportional to the frequency offset $f_o$, and with a constant term C due to the batch adaptive weighting.

Figure 6A:
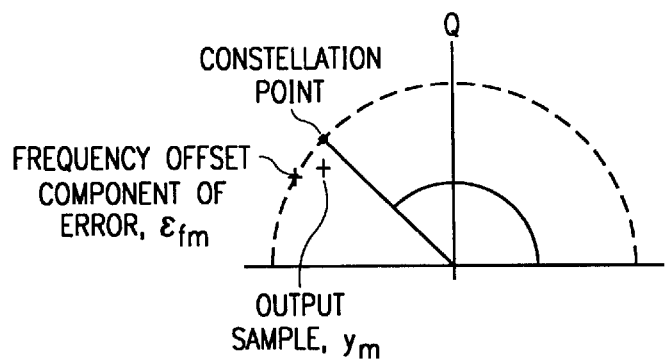
FIGS. 6A and 6B illustrate removal of the modulation as part of the processing of received data in accordance with the processing illustrated in FIG. 4.
Figure 6B:
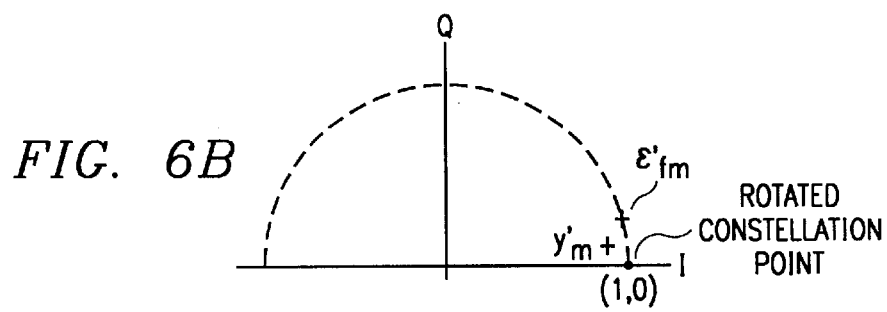

Referring to FIGS. 6A and 6B, there is illustrated the removal during routine 414 of the modulation by multiplying the conjugate of a constellation point. FIG. 6A shows a constellation point, an output sample, and an associated error component $\epsilon_{fm}$. Removal of the modulation by multiplying by the conjugate of the constellation point rotates the constellation point back to the (1,0) point, and the output and errors to relative positions about that point as shown in FIG. 6B.

Figure 7A:
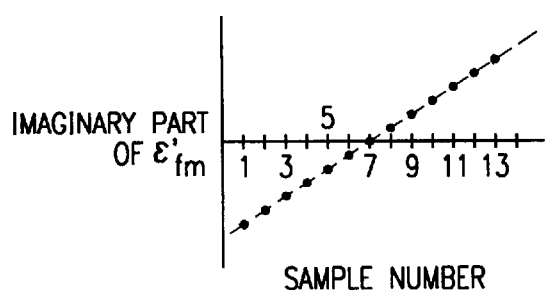
FIG. 7A illustrates the imaginary (quadrature) part of the frequency offset components of the errors following rotation.
Figure 7B:
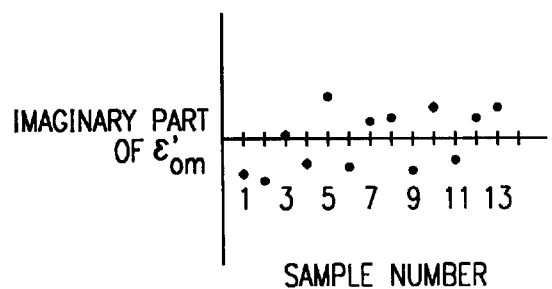
FIG. 7B illustrates the imaginary (quadrature) part of the random components of the errors following rotation.
Figure 7C:
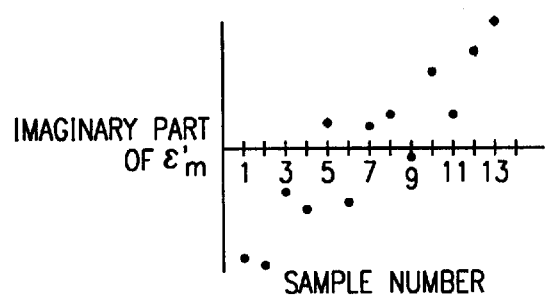
FIG. 7C illustrates the imaginary (quadrature) part of the rotated errors comprising the sum of the components shown in FIGS. 7A and 7B.

Referring again to FIG. 4, at this point in the processing a set of rotated error samples has been obtained. Each sample is composed of a deterministic part due to the frequency offset and a random part due to residual noise and interference. This is shown in FIG. 7A, 7B and 7C. The rotated deterministic part of the sequence has a linear progression along the imaginary axis. This is shown in FIG. 7A as a linear increase in the imaginary values as sample number increases. This is for a positive frequency offset. With a negative offset, the imaginary values would decrease. FIG. 7B shows the imaginary part of the random component of the rotated error. This is the error that is due to noise and residual interference. FIG. 7C shows the imaginary part of the total rotated error, which is the sum of the deterministic and random errors. The total rotated error is obtained from the procedure 414 in FIG. 4.

Next in routine 416 an estimate of the frequency offset is completed by plotting a best fit line to the rotated errors. The frequency offset is given (to a very close approximation) by the slope of the dotted line shown in FIG. 7A. However, the data of FIG. 7A is not available. The data of FIG. 7C is available. A straight line is fit to the data of FIG. 7C to obtain the slope of the fitted line. The slope of the fitted line is an estimate of the slope of the line in FIG. 7A, and hence is an estimate of the frequency offset.

The fitting of the line to the imaginary part of the rotated error samples is another least-squares process, different from the adaptive processing least squares. Here, there is a fitting of a straight line to "best" fit the data of FIG. 7C. This is a well known problem of classic mathematics. The slope (M) of the "best" fit line is given by $$M = \frac{\sum_{m=1}^{Ns}\left(m - \frac{Ns+1}{2}\right) \cdot q_m}{\sum_{m=1}^{Ns}\left(m - \frac{Ns+1}{2}\right)^2},\quad (16)$$

where M is the slope of the line and is also the estimated frequency offset, Ns is the number of training sequence samples used in the computation, $q_m$ is the imaginary component of the $m^{th}$ rotated error sample $\epsilon'_m$, and m is the sample index.

At this point in the procedure, there is obtained an estimate of the frequency offset. The value M above, is that estimate in units of radians/sample. Returning to FIG. 4, the program for frequency offset correction continues at routine 418 to apply a correction factor to the entire timeslot of data. The correction factor is applied to the data by multiplying each successive data sample by a complex exponential:

$$x'(k) = \begin{cases} x(k) \cdot \exp(-ikFT); & \text{for } Ns \text{ odd} \\ x(k) \cdot \exp(-i(k+1/2)FT); & \text{for } Ns \text{ even} \end{cases}, \quad (17)$$

where Ns is the number of training sequence samples used for determining M, x(k) is the $k^{th}$ vector input sample, x'(k) is the corrected vector input sample, T is the symbol duration, and F is the correction factor. The sample index k (a counter) starts at zero either at the(Ns+1)/2 sample of the set used for determining M (for Ns odd) or at the Ns/2+1 sample (for Ns even). The index k ranges positively for samples following k=0 and negatively for samples preceding k=0.

In the simplest form, the correction factor F is simply the frequency offset estimate M obtained above. That is, in the simplest form, $$F=M. \quad (18)$$

However, to improve the accuracy of the correction factor, it may be desirable to base the correction factor on a filtered or average value of M. The frequency offset estimate M is computed from noisy data, and so is itself noisy. Filtering or averaging the estimate will reduce the noise content of the correction factor and improve its accuracy. Candidate approaches for this filtering include the simple boxcar (sliding window) average, the exponential decay average, the alpha-beta tracking filter, and the Kalman tracking filter. Here, the tracking filters are tracking the frequency offset of the mobile phone, which is a thermal drift (i.e. slowly changing) process.

Referring again to FIG. 4, to obtain a filtered value for the frequency offset estimate, the process continues from routine 416 to a filter computation at routine 420 wherein a filtered estimate of multiple measurements of the frequency offset estimate is obtained. Preferably, the filtering function would be achieved by use of a Kalman filter providing good performance and theoretical optimality. When filtered values of the frequency offset estimates are computed, the results of routine 420 are applied to the multiplication of each sample in the time slot as described with reference to routine 418.

Using either the single value frequency offset estimate or the filtered value computed in routine 420, the results of the multiplication of each sample in the time slot routine 418 is applied to a recursive processor utilizing least squares computation in routine 422 for additional received signal processing. As previously explained, the recursive processing uses prior coefficients to obtain a reference symbol, which enables both the updating of the coefficients and the computation of an output symbol by using the current (recently updated) coefficients. The recursive least squares processing is completed for the data received in a time slot.

Although the frequency offset correction of the present invention has been described with reference to least-squares adaptive antennas, the method described here is directly applicable to several other least-square processes that are commonly used. These include (but are not limited to) linear equalizers with either symbol spaced taps or fractional symbol spaced taps, decision feedback equalizers, and space-time adaptive antenna structures.

Figure 8A:
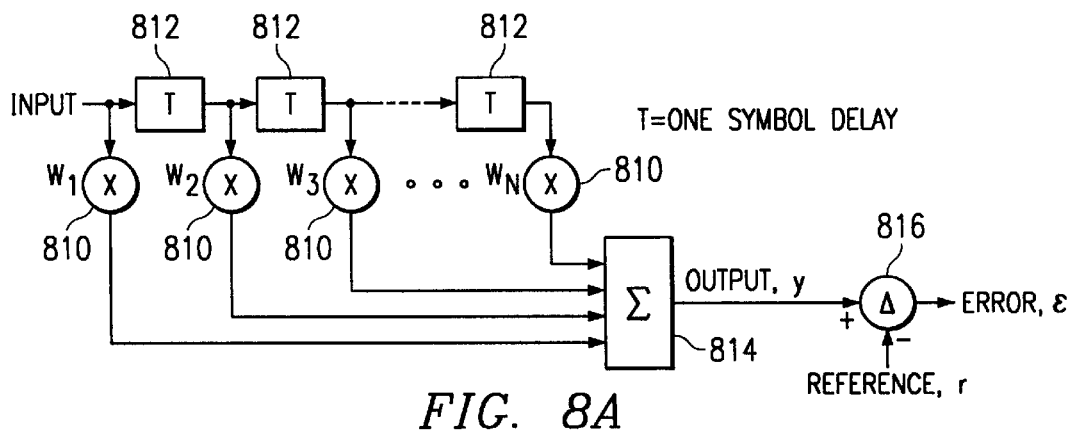
FIGS. 8A and 8B are block diagrams of linear equalizers using least squares computation for weight control.

Referring to FIG. 8A, there is illustrated a block diagram of the processor 16 for a symbol spaced linear equalizer utilizing least squares computation for weight control and frequency offset correction in accordance with the process of FIG. 4. Each weight factor multiplication 810 is separated by a one symbol delay line 812. The individual weighted symbols are added together in a summing network 814 and the output applied to a difference operation 816. The output of the difference operation 816 is the least square error resulting from the routine 412 of FIG. 4.

Figure 8B:
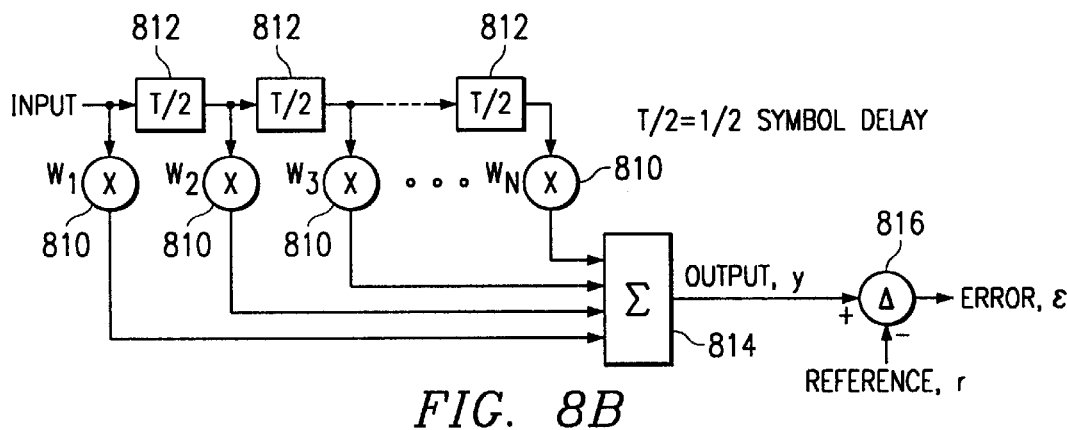

Referring to FIG. 8B, there is illustrated a block diagram of the processor 16 of FIG. 1 for a half-symbol spaced linear equalizer utilizing least squares for weight control. The difference between the linear equalizer of FIG. 8A and the linear equalizer of FIG. 8B is the use of two samples per symbol and a one-half symbol delay for the delay lines 812. Other fractional symbol spacings (e.g. ⅓ or ¼ symbol) are also common. Again, the output of the difference operation 816 is the least square error resulting from the routine 412 of FIG. 4.

Figure 9:
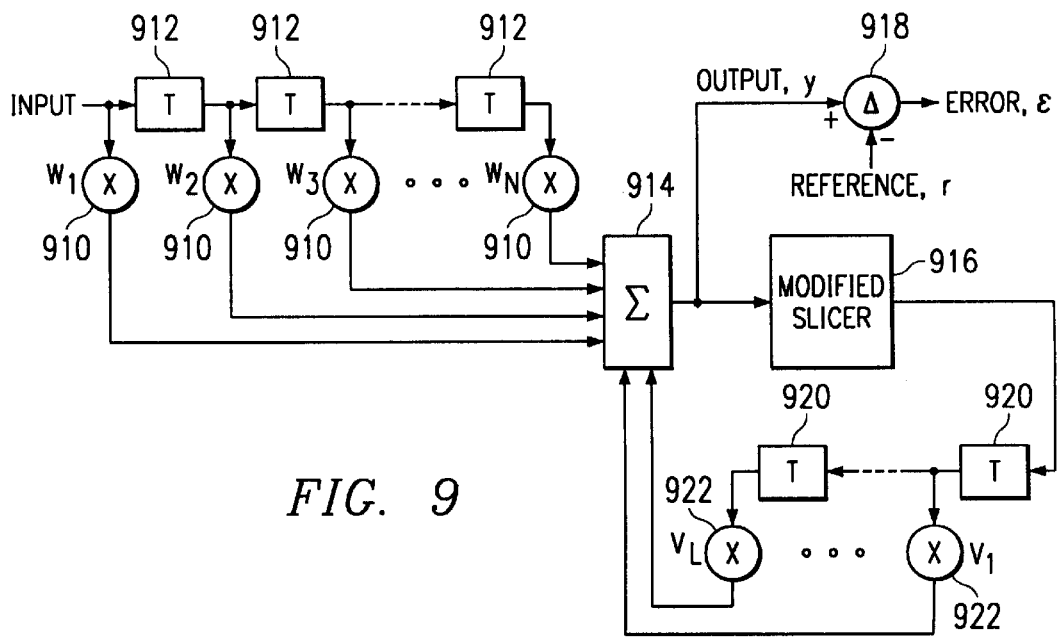
FIG. 9 is a block diagram of a decision feedback equalizer utilizing feed forward weights and feedback weights.

Referring to FIG. 9, there is shown a block diagram of the processor 16 in a decision feedback equalizer utilizing N feed forward weights and L feedback weights. Complex multipliers 910 are spaced by one symbol delay lines 912 with the outputs of the complex multipliers applied to a summing network 914. The results from the summing network 914 are applied to a modified slicer 916 and the difference operation 918. The modified slicer 916 decides which constellation point is nearest the output symbol y and outputs a complex number corresponding to that constellation point. The modified slicer is part of a feedback network that includes time delays 920 and complex multipliers 922 applying the feedback weights $V_i$ to the output of the associated time delay. The output of the complex multipliers 922 is applied to the summing network 914 to provide decision feedback for the signal applied to the difference operation 918. The results of the difference operation 918 is the least square error resulting from the processing routine 412 of FIG. 4. The least square processing in this case computes both the feedforward coefficients $W_i$ and the feedback coefficients $V_i$. Although FIG. 9 depicts symbol spaced delay lines 912 in the feedforward section of the processor, the delay lines 912 could also be fractionally spaced delay lines, as in FIG. 8B.

Figure 10:
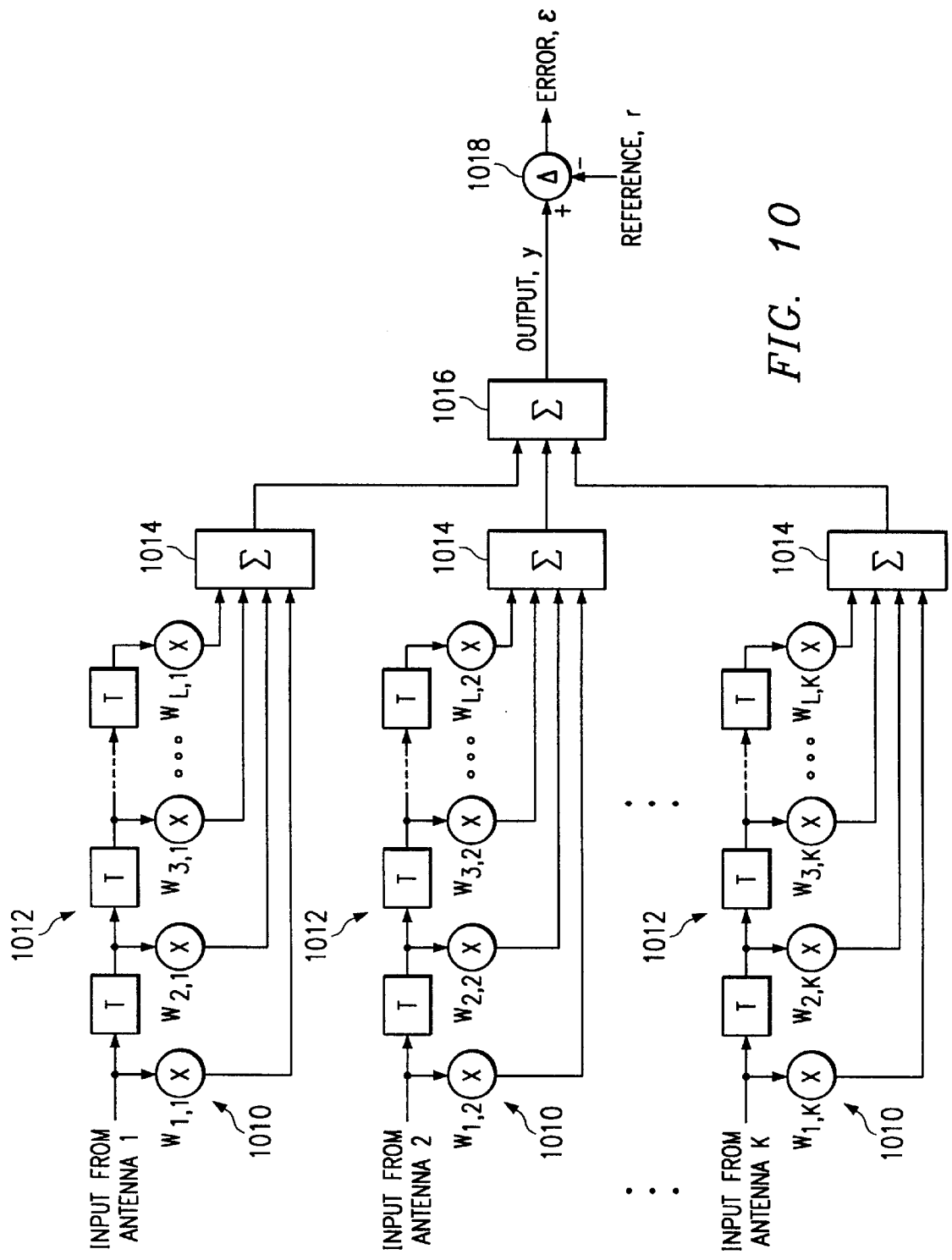
FIG. 10 is a block diagram of a space-time adaptive antenna using least squares computation for weight control.

Referring to FIG. 10, there is shown a block diagram of the processor 16 in a space-time adaptive antenna wherein the processor 16 utilizes least squares processing for weight control. The processing of FIG. 10 is similar to the processing of the linear equalizer of FIG. 8A. Inputs from each of the antenna elements is processed through complex multipliers 1010. Each of the complex multipliers 1010 is connected to a time delay 1012 with the output of the complex multipliers for each antenna element applied to a summing network 1014. The output from each of the summing networks 1014 is applied to a summing network 1016 having an output to a difference operation 1018. The output of the difference operation 1018 is the least squared error resulting from the computation of routine 412 of FIG. 4. As in the case of FIG. 8B, the delay lines 1012 of FIG. 10 could be fractionally spaced without significantly affecting the signal processing.

Although several embodiments of the present invention have been described in the foregoing detailed description and illustrated in the accompanying drawings, it would be understood by those skilled in the art that the invention is not limited to the embodiments disclosed, but is capable of numerous rearrangements, substitutions and modifications without departing from the spirit of the invention.

What is claimed is:

1. A method for estimating the frequency offset of received signals of a dataset comprising:
   (a) computing a least squares weight solution for a batch of data samples to obtain a least squares error sample for each data sample, each error sample comprising real and imaginary parts;
   (b) rotating each error sample by multiplying by the conjugate of a corresponding reference sample;
   (c) numbering each rotated error sample in the order received; and
   (d) computing a frequency offset estimate from the imaginary parts of the rotated error samples as a function of the number of each rotated error sample.

2. The method of estimating the frequency offset of received signals as set forth in claim 1 further comprising:
   (e) repeating steps (a) through (d) to compute a plurality of frequency offset estimates; and
   (f) filtering the plurality of frequency offset estimates to obtain a filtered frequency offset estimate.

3. The method of estimating the frequency offset of received signals as set forth in claim 1 wherein the dataset includes a training dataset sequence, and computing a least squares weight solution, comprises:
   computing a least squares weight solution for the training dataset sequence of data samples to obtain a least squares error sample for each data sample from the training dataset sequence.

4. The method of estimating the frequency offset of received signals as set forth in claim 3, wherein the received signals of a dataset comprises a training dataset sequence, and wherein the rotating rotate each error sample comprises rotating each error sample by multiplying by the conjugate of the corresponding reference sample from the training dataset sequence.

5. A method of correcting the frequency offset of a dataset of received signals, comprising:
   receiving a batch of data samples in a selected time slot of the dataset;
   computing a least squares weight solution for the batch of data samples to obtain a least square error sample for each data sample, each error comprising real and imaginary parts;
   rotating each error sample by multiplying by the conjugate of a corresponding internal reference sample;
   computing a frequency offset estimate from the imaginary part of rotated error samples as a function of the received order of each rotated error sample; and
   multiplying each data sample by an expression that includes the frequency offset estimate to obtain frequency offset corrected samples.

6. The method of correcting the frequency offset of a dataset of received signals as set forth in claim 5 further comprising:
   numbering each rotated error sample in the order received prior to computing the frequency offset estimate from the imaginary part of rotated error samples.

7. The method of correcting the frequency offset of a dataset of received signals as set forth in claim 5 further comprising:
   computing a plurality of values for frequency offset estimates; and
   filtering the plurality of values of frequency offset estimates to obtain a filtered value of frequency offset estimate for the offset correction of each sample.

8. The method of correcting the frequency offset of a dataset of received signals as set forth in claim 5 wherein the received batch of data samples comprises a training data sample sequence and wherein rotating each error sample comprises multiplying each error sample by the conjugate of the corresponding internal reference sample derived from the training sample sequence.

9. A method of processing a dataset of received signals in a communications system having a training data sample sequence, comprising:
   receiving the training data sample sequence in a selected time slot of the dataset;
   computing a frequency offset estimate value for the dataset from a batch of data samples in the training data sample sequence;
   applying a frequency offset correction to each sample in the dataset in accordance with a complex exponential function including the frequency offset estimate as a term thereof.

10. The method of processing a dataset of received signals in a communications system as set forth in claim 9 wherein computing a frequency offset estimate comprises:

computing a least squares weight solution for the data samples in the received training sequence to obtain a least square error sample for each data sample, each error comprising real and imaginary parts;

rotating each error sample by multiplying by the conjugate of a corresponding internal reference sample comprising a sample of the training sequence; and computing the frequency offset estimate from the imaginary parts of rotated error samples as a function of the order received.

11. The method of processing a dataset of received signals in a communications system as set forth in claim 10 further comprising numbering each rotated error sample in the order received prior to computing the frequency offset estimate.

12. The method of processing a dataset of received signals in a communication system as set forth in claim 11 further comprising:

computing a plurality of values of the frequency offset estimates; and filtering the plurality of values of the frequency offset estimate to obtain a value of a filtered estimate to be applied to the samples of the dataset.

* * * * *

UNITED STATES PATENT AND TRADEMARK OFFICE
CERTIFICATE OF CORRECTION

PATENT NO. : 6,393,073 B1
DATED : May 21, 2002
INVENTOR(S) : Henry S. Eilts

It is certified that error appears in the above-identified patent and that said Letters Patent is hereby corrected as shown below:

Column 1,
Line 54, the word "batch" should be italicized.
Line 56, after "solving", delete "Lease" and insert -- Least --.
Line 56, the title "Solving Least Square Problems" should be italicized.

Column 2,
Line 10, the word "recursive" should be italicized.
Line 30, the title "EIA Interim Standard IS-136.2" should be italicized.

Column 4,
Line 36, after the word "subscript", the letter "i" should be italicized.

Column 5,
Line 40, after "The", delete "incomming", and insert -- incoming --.
Line 54, the word "batch" should be italicized.
Line 62, the word "recursive" should be italicized.

Column 7,
Line 30, after "constellation", delete "," and insert -- . --.

Column 8,
Line 11, after "component", delete "$\beta_{fm}$" and insert -- $\varepsilon_{fm}$ --.
Line 13, after "Therefore," delete "$\delta_m$" and insert -- $\beta_m$ --.

Column 12,
Line 12, after "wherein", delete "the rotating rotate", and insert -- rotating --.

Signed and Sealed this

Twentieth Day of August, 2002

Attest:

*Attesting Officer*

JAMES E. ROGAN
*Director of the United States Patent and Trademark Office*